(12) United States Patent
Morin et al.

(10) Patent No.: US 8,463,284 B2
(45) Date of Patent: Jun. 11, 2013

(54) SHORT MESSAGING SYSTEM (SMS) PROXY COMMUNICATIONS TO ENABLE LOCATION BASED SERVICES IN WIRELESS DEVICES

(75) Inventors: Drew Morin, Davidson, MD (US); Mark Titus, Annapolis, MD (US); Walter Weichselbaumer, Miramar, FL (US)

(73) Assignee: TeleCommunication Systems, Inc., Annapolis, MD (US)

( * ) Notice: Subject to any disclaimer, the term of this patent is extended or adjusted under 35 U.S.C. 154(b) by 916 days.

(21) Appl. No.: 11/487,333

(22) Filed: Jul. 17, 2006

(65) Prior Publication Data

US 2008/0014971 A1    Jan. 17, 2008

(51) Int. Cl.
*H04W 24/00* (2009.01)
*H04W 4/00* (2009.01)

(52) U.S. Cl.
USPC ........................................ 455/456.1; 455/466

(58) Field of Classification Search
USPC .............................................. 455/456.1, 466
See application file for complete search history.

(56) References Cited

U.S. PATENT DOCUMENTS

| | | | |
|---|---|---|---|
| 1,103,073 A | 7/1914 | O'Connel |
| 3,400,222 A | 9/1968 | Nightingale |
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,952,928 A | 8/1990 | Carrol et al. |
| 5,014,206 A | 5/1991 | Scribner et al. |
| 5,043,736 A | 8/1991 | Darnell et al. |
| 5,055,851 A | 10/1991 | Sheffer et al. |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori et al. |
| 5,119,104 A | 6/1992 | Heller |
| 5,144,283 A | 9/1992 | Arens et al. |
| 5,161,180 A | 11/1992 | Chavous |
| 5,177,478 A | 1/1993 | Wagai et al. |
| 5,193,215 A | 3/1993 | Olmer |
| 5,208,756 A | 5/1993 | Song |

(Continued)

OTHER PUBLICATIONS

International Search Report in PCT/US2007/20207 dated Apr. 1, 2008.

(Continued)

*Primary Examiner* — Kamran Afshar
*Assistant Examiner* — Omoniyi Obayanju
(74) *Attorney, Agent, or Firm* — William H. Bollman (57) ABSTRACT

Wireless devices communicate (using SMS messaging) with a proxy server (e.g., a wireless messaging gateway) to generate network initiated requests. In this way, a wireless device which might not otherwise be able to, can now participate in advanced applications such as location based services (LBS) communities, thus extending LBS presence type information to non-programmable wireless devices. Short messaging system (SMS) functionality is implemented as a least-common-denominator means enabling standardized communication between a wireless device and a wireless device application. Wireless devices use SMS messaging as a proxy communications means to communicate with a proxy server (e.g., a wireless messaging gateway) to generate network initiated requests. The network initiated requests are packaged within SMS messages, allowing wireless devices a simple mechanism for participating in, e.g., location based services (LBS) communities, and for generally extending LBS presence type information to non-programmable handset devices.

19 Claims, 6 Drawing Sheets

U.S. PATENT DOCUMENTS

| | | | |
|---|---|---|---|
| 5,214,789 A | 5/1993 | George | |
| 5,218,367 A | 6/1993 | Sheffer et al. | |
| 5,223,844 A | 6/1993 | Mansell et al. | |
| 5,235,630 A | 8/1993 | Moody et al. | |
| 5,239,570 A | 8/1993 | Koster et al. | |
| 5,266,944 A | 11/1993 | Carroll et al. | |
| 5,289,527 A | 2/1994 | Tiedemann, Jr. | |
| 5,293,642 A | 3/1994 | Lo | |
| 5,299,132 A | 3/1994 | Wortham | |
| 5,325,302 A | 6/1994 | Izidon et al. | |
| 5,334,974 A | 8/1994 | Simms et al. | |
| 5,343,493 A | 8/1994 | Karimullah | |
| 5,347,568 A | 9/1994 | Moody et al. | |
| 5,351,235 A | 9/1994 | Lahtinen | |
| 5,361,212 A | 11/1994 | Class et al. | |
| 5,363,425 A | 11/1994 | Muffi et al. | |
| 5,374,936 A | 12/1994 | Feng | |
| 5,379,451 A | 1/1995 | Nakagoshi et al. | |
| 5,381,338 A | 1/1995 | Wysocki et al. | |
| 5,387,993 A | 2/1995 | Heller et al. | |
| 5,388,147 A | 2/1995 | Grimes | |
| 5,390,339 A | 2/1995 | Bruckert et al. | |
| 5,394,158 A | 2/1995 | Chia | |
| 5,396,227 A | 3/1995 | Carroll et al. | |
| 5,398,190 A | 3/1995 | Worthham | |
| 5,406,614 A | 4/1995 | Hara | |
| 5,418,537 A | 5/1995 | Bird | |
| 5,423,076 A | 6/1995 | Westergren et al. | |
| 5,432,841 A | 7/1995 | Rimer | |
| 5,434,789 A | 7/1995 | Fraker et al. | |
| 5,454,024 A | 9/1995 | Lebowitz | |
| 5,461,390 A | 10/1995 | Hoshen | |
| 5,470,233 A | 11/1995 | Fruchterman et al. | |
| 5,479,408 A | 12/1995 | Will | |
| 5,479,482 A | 12/1995 | Grimes | |
| 5,485,161 A | 1/1996 | Vaughn | |
| 5,485,163 A | 1/1996 | Singer et al. | |
| 5,488,563 A | 1/1996 | Chazelle et al. | |
| 5,497,149 A | 3/1996 | Fast | |
| 5,508,931 A | 4/1996 | Snider | |
| 5,513,243 A | 4/1996 | Kage | |
| 5,515,287 A | 5/1996 | Hakoyama et al. | |
| 5,519,403 A | 5/1996 | Bickley et al. | |
| 5,532,690 A | 7/1996 | Hertel | |
| 5,535,434 A | 7/1996 | Siddoway et al. | |
| 5,539,398 A | 7/1996 | Hall et al. | |
| 5,543,776 A | 8/1996 | L'esperance | |
| 5,552,772 A | 9/1996 | Janky et al. | |
| 5,555,286 A | 9/1996 | Tendler | |
| 5,568,119 A | 10/1996 | Schipper et al. | |
| 5,574,648 A | 11/1996 | Pilley | |
| 5,579,372 A | 11/1996 | Åstrom | |
| 5,588,009 A | 12/1996 | Will | |
| 5,592,535 A | 1/1997 | Klotz | |
| 5,604,486 A | 2/1997 | Lauro et al. | |
| 5,606,313 A | 2/1997 | Allen et al. | |
| 5,606,850 A | 3/1997 | Nakamura | |
| 5,610,815 A | 3/1997 | Gudat et al. | |
| 5,614,890 A | 3/1997 | Fox | |
| 5,615,116 A | 3/1997 | Gudat et al. | |
| 5,621,793 A | 4/1997 | Bednarek et al. | |
| 5,628,051 A | 5/1997 | Salin | |
| 5,633,912 A | 5/1997 | Tsoi | |
| 5,673,306 A | 9/1997 | Amadon et al. | |
| 5,682,600 A | 10/1997 | Salin | |
| 5,692,037 A | 11/1997 | Friend | |
| 5,740,534 A | 4/1998 | Ayerst et al. | |
| 5,761,618 A | 6/1998 | Lynch et al. | |
| 5,767,795 A | 6/1998 | Schaphorst | |
| 5,768,509 A | 6/1998 | Gunluk | |
| 5,774,533 A | 6/1998 | Patel | |
| 5,787,357 A | 7/1998 | Salin | |
| 5,794,142 A | 8/1998 | Vantilla et al. | |
| 5,797,091 A | 8/1998 | Clise et al. | |
| 5,797,094 A | 8/1998 | Houde et al. | |
| 5,797,096 A | 8/1998 | Lupien et al. | |
| 5,802,492 A | 9/1998 | DeLorme et al. | |
| 5,806,000 A | 9/1998 | Vo et al. | |
| 5,822,700 A | 10/1998 | Hult et al. | |
| 5,825,283 A | 10/1998 | Camhi | |
| 5,828,740 A | 10/1998 | Khuc et al. | |
| 5,905,736 A | 5/1999 | Ronen et al. | |
| 5,920,820 A | 7/1999 | Qureshi | |
| 5,920,821 A | 7/1999 | Seazholtz et al. | |
| 5,930,701 A | 7/1999 | Skog | |
| 5,943,399 A | 8/1999 | Bannister et al. | |
| 5,946,629 A | 8/1999 | Sawyer et al. | |
| 5,946,630 A | 8/1999 | Willars et al. | |
| 5,950,130 A | 9/1999 | Coursey | |
| 5,953,398 A | 9/1999 | Hill | |
| 5,974,054 A | 10/1999 | Couts et al. | |
| 5,978,685 A | 11/1999 | Laiho | |
| 5,987,323 A | 11/1999 | Huotari | |
| 5,999,811 A | 12/1999 | Molne | |
| 6,026,292 A | 2/2000 | Coppinger | |
| 6,035,025 A | 3/2000 | Hanson | |
| 6,049,710 A | 4/2000 | Nilsson | |
| 6,058,300 A | 5/2000 | Hanson | |
| 6,064,875 A | 5/2000 | Morgan | |
| 6,070,067 A | 5/2000 | Nguyen et al. | |
| 6,073,004 A | 6/2000 | Balachandran | |
| 6,073,015 A | 6/2000 | Berggren | |
| 6,075,982 A | 6/2000 | Donovan et al. | |
| 6,081,508 A | 6/2000 | West et al. | |
| 6,101,378 A | 8/2000 | Barabash et al. | |
| 6,122,503 A | 9/2000 | Daly | |
| 6,122,520 A | 9/2000 | Want et al. | |
| 6,138,158 A | 10/2000 | Boyle et al. | |
| 6,148,197 A | 11/2000 | Bridges et al. | |
| 6,148,198 A | 11/2000 | Anderson et al. | |
| 6,149,353 A | 11/2000 | Nilsson | |
| 6,169,891 B1 | 1/2001 | Gorham et al. | |
| 6,173,181 B1 | 1/2001 | Losh | |
| 6,181,935 B1 | 1/2001 | Gossman et al. | |
| 6,188,752 B1 | 2/2001 | Lesley | |
| 6,198,431 B1 | 3/2001 | Gibson | |
| 6,199,045 B1 | 3/2001 | Giniger et al. | |
| 6,205,330 B1 | 3/2001 | Winbladh | |
| 6,208,854 B1 | 3/2001 | Roberts et al. | |
| 6,219,669 B1 | 4/2001 | Haff | |
| 6,223,046 B1 | 4/2001 | Hamill-Keays et al. | |
| 6,226,529 B1 | 5/2001 | Bruno et al. | |
| 6,249,680 B1 | 6/2001 | Wax et al. | |
| 6,249,744 B1 | 6/2001 | Morita | |
| 6,266,614 B1 | 7/2001 | Alumbaugh | |
| 6,289,373 B1 | 9/2001 | Dezonno | |
| 6,314,108 B1 | 11/2001 | Ramasubramani et al. | |
| 6,317,594 B1 | 11/2001 | Gossman et al. | |
| 6,321,257 B1 | 11/2001 | Kotola et al. | |
| 6,327,479 B1 | 12/2001 | Mikkola | |
| 6,353,621 B1 | 3/2002 | Boland | |
| 6,370,242 B1 | 4/2002 | Speers | |
| 6,373,930 B1 | 4/2002 | McConnell et al. | |
| 6,393,014 B1 | 5/2002 | Daly et al. | |
| 6,396,913 B1 | 5/2002 | Perkins, III | |
| 6,397,064 B1 | 5/2002 | Bridges | |
| 6,473,622 B1 | 10/2002 | Meuronen | |
| 6,480,710 B1 | 11/2002 | Laybourn | |
| 6,507,589 B1 | 1/2003 | Ramasubramani et al. | |
| 6,512,930 B2 | 1/2003 | Sandegren | |
| 6,526,335 B1 | 2/2003 | Treyz et al. | |
| 6,654,786 B1 | 11/2003 | Fox et al. | |
| 6,667,688 B1 | 12/2003 | Menard et al. | |
| 6,677,894 B2 | 1/2004 | Sheynblat | |
| 6,690,940 B1 | 2/2004 | Brown | |
| 6,728,353 B1 | 4/2004 | Espejo | |
| 6,731,943 B1 | 5/2004 | McCormick | |
| 6,842,449 B2 | 1/2005 | Hardjono | |
| 6,868,074 B1 | 3/2005 | Hanson | |
| 6,898,633 B1 | 5/2005 | Lyndersay | |
| 6,915,138 B2 | 7/2005 | Kraft | |
| 6,970,871 B1 | 11/2005 | Rayburn | |
| 6,993,325 B1 | 1/2006 | Waesterlid | |
| 7,020,480 B2 | 3/2006 | Coskun | |
| 7,110,773 B1 | 9/2006 | Wallace | |
| 7,120,418 B2 | 10/2006 | Herajarvi | |
| 7,123,874 B1 | 10/2006 | Brennan | |

| | | |
|---|---|---|
| 7,127,264 B2 | 10/2006 | Hronek |
| 7,130,383 B2 | 10/2006 | Naidoo et al. |
| 7,145,462 B2 | 12/2006 | Dewing |
| 7,180,415 B2 | 2/2007 | Banker et al. |
| 7,245,216 B2 | 7/2007 | Burkley |
| 7,317,705 B2 | 1/2008 | Hanson |
| 7,328,031 B2 | 2/2008 | Kraft |
| 7,356,328 B1 | 4/2008 | Espejo |
| 7,386,588 B2 | 6/2008 | Mousseau |
| 7,437,348 B1 | 10/2008 | Wyett |
| 7,444,342 B1 | 10/2008 | Hall |
| 7,522,182 B2 | 4/2009 | Bang |
| 7,792,989 B2 | 9/2010 | Toebes |
| 7,826,818 B2 | 11/2010 | Gollnick |
| 7,864,927 B2 | 1/2011 | Loizeaux |
| RE42,927 E | 11/2011 | Want |
| 8,200,291 B2 | 6/2012 | Steinmetz |
| 2001/0006889 A1 | 7/2001 | Kraft |
| 2001/0034224 A1 | 10/2001 | McDowell et al. |
| 2002/0155844 A1 | 10/2002 | Rankin |
| 2003/0003909 A1 | 1/2003 | Keronen |
| 2003/0058096 A1 | 3/2003 | Shteyn |
| 2003/0060214 A1 | 3/2003 | Hendrey |
| 2003/0157942 A1 | 8/2003 | Osmo |
| 2003/0169881 A1 | 9/2003 | Niedermeyer |
| 2003/0186709 A1 | 10/2003 | Rhodes |
| 2003/0186710 A1 | 10/2003 | Muhonen |
| 2003/0220835 A1 | 11/2003 | Barnes, Jr. |
| 2004/0077359 A1 | 4/2004 | Bernas |
| 2004/0137921 A1* | 7/2004 | Valloppillil et al. ........... 455/466 |
| 2004/0176123 A1 | 9/2004 | Chin |
| 2004/0198386 A1 | 10/2004 | Dupray |
| 2004/0198389 A1 | 10/2004 | Alcock |
| 2004/0203863 A1 | 10/2004 | Huomo |
| 2004/0203900 A1* | 10/2004 | Cedervall et al. .......... 455/456.1 |
| 2004/0209594 A1 | 10/2004 | Naboulsi |
| 2005/0003803 A1 | 1/2005 | Buckley |
| 2005/0020242 A1 | 1/2005 | Holland |
| 2005/0071671 A1 | 3/2005 | Karaoguz |
| 2005/0079877 A1 | 4/2005 | Ichimura |
| 2005/0101338 A1 | 5/2005 | Kraft |
| 2005/0149430 A1 | 7/2005 | Williams |
| 2005/0176445 A1 | 8/2005 | Qu |
| 2005/0197775 A1 | 9/2005 | Smith |
| 2005/0261012 A1 | 11/2005 | Weiser |
| 2005/0265536 A1 | 12/2005 | Smith |
| 2005/0277432 A1 | 12/2005 | Viana et al. |
| 2005/0282518 A1 | 12/2005 | D'Evelyn |
| 2006/0003775 A1 | 1/2006 | Bull et al. |
| 2006/0020965 A1 | 1/2006 | Steelberg |
| 2006/0028995 A1 | 2/2006 | Canoy |
| 2006/0058102 A1 | 3/2006 | Nguyen |
| 2006/0109960 A1 | 5/2006 | D'Evelyn |
| 2006/0116138 A1 | 6/2006 | Simsek et al. |
| 2006/0142027 A1 | 6/2006 | Krishnamurthi et al. |
| 2006/0183460 A1 | 8/2006 | Srinivasan et al. |
| 2006/0223549 A1 | 10/2006 | Chang |
| 2006/0233317 A1 | 10/2006 | Coster |
| 2006/0276168 A1 | 12/2006 | Fuller |
| 2007/0004424 A1 | 1/2007 | Sheen |
| 2007/0021098 A1 | 1/2007 | Rhodes |
| 2007/0110076 A1 | 5/2007 | Brouwer |
| 2007/0117574 A1 | 5/2007 | Watanabe |
| 2007/0117577 A1 | 5/2007 | Harris |
| 2007/0136132 A1 | 6/2007 | Weiser |
| 2007/0149208 A1* | 6/2007 | Syrbe et al. ................ 455/456.1 |
| 2008/0014964 A1 | 1/2008 | Sudit |
| 2008/0268769 A1 | 10/2008 | Brown |
| 2009/0029675 A1 | 1/2009 | Steinmetz |
| 2009/0221263 A1 | 9/2009 | Titus |
| 2009/0323636 A1 | 12/2009 | Dillon |
| 2010/0076767 A1 | 3/2010 | Vieri |
| 2010/0120412 A1 | 5/2010 | Tang |
| 2010/0167691 A1 | 7/2010 | Howarter |
| 2011/0109468 A1 | 5/2011 | Hirschfeld |

OTHER PUBLICATIONS

International Search Report in PCT/US2007/21133 dated Apr. 21, 2008.
PCT Search Report issued in PCT/US008/13690 and mailed on Jan. 29, 2009.
International Search Report in PCT/US2007/026132 dated Jun. 6, 2008.
International Search Report in PCT/US2007/16138 dated Nov. 18, 2008,
Newsletter "Sonera Bill Warning" Digital Cellular Report. Stevenage: Jun. 17, 1998. vol. 4, Iss.; p. 1.
"Technology Rides Control Network to Support Short Package Applications"; Advanced Intelligent Network New. Washington, DC: Mar. 19, 1997. vol. 7, Iss. 6; p. 1.
Cellular Mobile Pricing Structures and Trends; Dr. Sam Paltridge of the OECD's Directorate for Science, Technology and Industry; Dist.: May 19, 2000 (Nov. 1999).
47 code of federal regulations (Oct. 1, 2005 Edition).
International Search Report in PCT/US11/01971 dated Feb. 28, 2013.
Kim, J.Y., et al., "An Enhanced VoIP Emergency Services Prototype," Proceedings of the 3$^{rd}$ International ISCRAM Conference, Newark, NJ, May 2006.
The Power of Mobile Unified Messaging: Siemans and Comverse to Demonstrate WAP-Based Messaging Applications on Live GPRS System, Comverse, Feb. 2000.
Bond, "Cellular Carriers Use Prepaid Programs to Reach Untapped Markets," Billing World, Mar. 1997, pp. 14-17.
Tecore, Inc., "Pre-Paid Cellular," sales literature, Mar. 25, 1997, pp. 1-4.
Proximity Media, How the Bluetooth Media Server Works, Aug. 23, 2006 pp. 1-3.

* cited by examiner

SHORT MESSAGING SYSTEM (SMS) PROXY COMMUNICATIONS TO ENABLE LOCATION BASED SERVICES IN WIRELESS DEVICES

BACKGROUND OF THE INVENTION

1. Field of the Invention

This invention relates generally to communications networks. More particularly, it relates to communication between a mobile (i.e., wireless) device and an application server running location based services using short messaging services (SMS) as a proxy.

2. Background of the Related Art

Wireless communication services are in increasing demand in response to a society which is becoming increasingly mobile. Traditionally, wireless communication services include voice cellular phone and paging services in which a user can make a telephone call or send/receive a page including a numeric message indicating a telephone number over a wireless network. More recently, paging services have been expanded to offer alphanumeric paging, which allows a short text based message to be sent to and displayed at a handheld pager.

In the early 1990s, as a result of the growing popularity of digital wireless technology, a standard for digital wireless networks was introduced in Europe. That standard, now known as the global standard for mobiles (GSM), included a service called short messaging service (SMS). An SMS allows transmission of short messages, typically up to 160 characters, to and from communication devices, e.g., cellular telephone handsets, telephones or computers with appropriate modems. In North America, the SMS is currently implemented on digital wireless/mobile networks, such as a PCS network based on the GSM standard, code division multiple access (CDMA) and/or time division multiple access (TDMA) methods. Short message services are gaining in popularity, particularly in the United States.

Short message services are advantageous over text based paging services because of the capability of bi-directional communication. Such bi-directional communication allows, for example, notification to the originating device of the success or failure of the short message delivery.

Each SMS network typically includes a short message service center (SMSC) which acts as a store-and-forward mechanism providing guaranteed delivery of short messages to a subscriber, even if the subscriber is inactive when the message was transmitted, by delivering the short messages once the subscriber becomes active. Delivery of all short messages is guaranteed regardless of whether or not the intended subscriber is "on-line" because the transmitted short message is stored within the SMS network and delivered to the intended subscriber from their assigned SMSC when the subscriber becomes available.

A variety of services have been introduced using SMS networks including, for example, integrated electronic mail and fax, integrated paging, interactive banking, and information services such as stock quotes and airline schedule delivery. A mobile originated-to-HTTP gateway (co-owned by the owner of the present patent application) has been patented in U.S. Pat. No. 6,891,811.

In operation, an SMSC receives a short message from any source intended to be delivered to a particular subscriber. When the intended subscriber is not available because, for example, it is turned off or is outside of the service area of the SMS network, the attempt to deliver the short message at that time will fail. In this case, the short message will be retained in the SMS network for a later delivery attempt. Thereafter, when the subscriber finally becomes available, e.g., is turned on or has moved into the service area of the SMS network, the relevant portions of the network (e.g., the mobile servicing center (MSC) and the home location register (HLR)) notify the SMSC to initiate delivery of the stored (i.e., previously failed) short messages.

Figure 4:
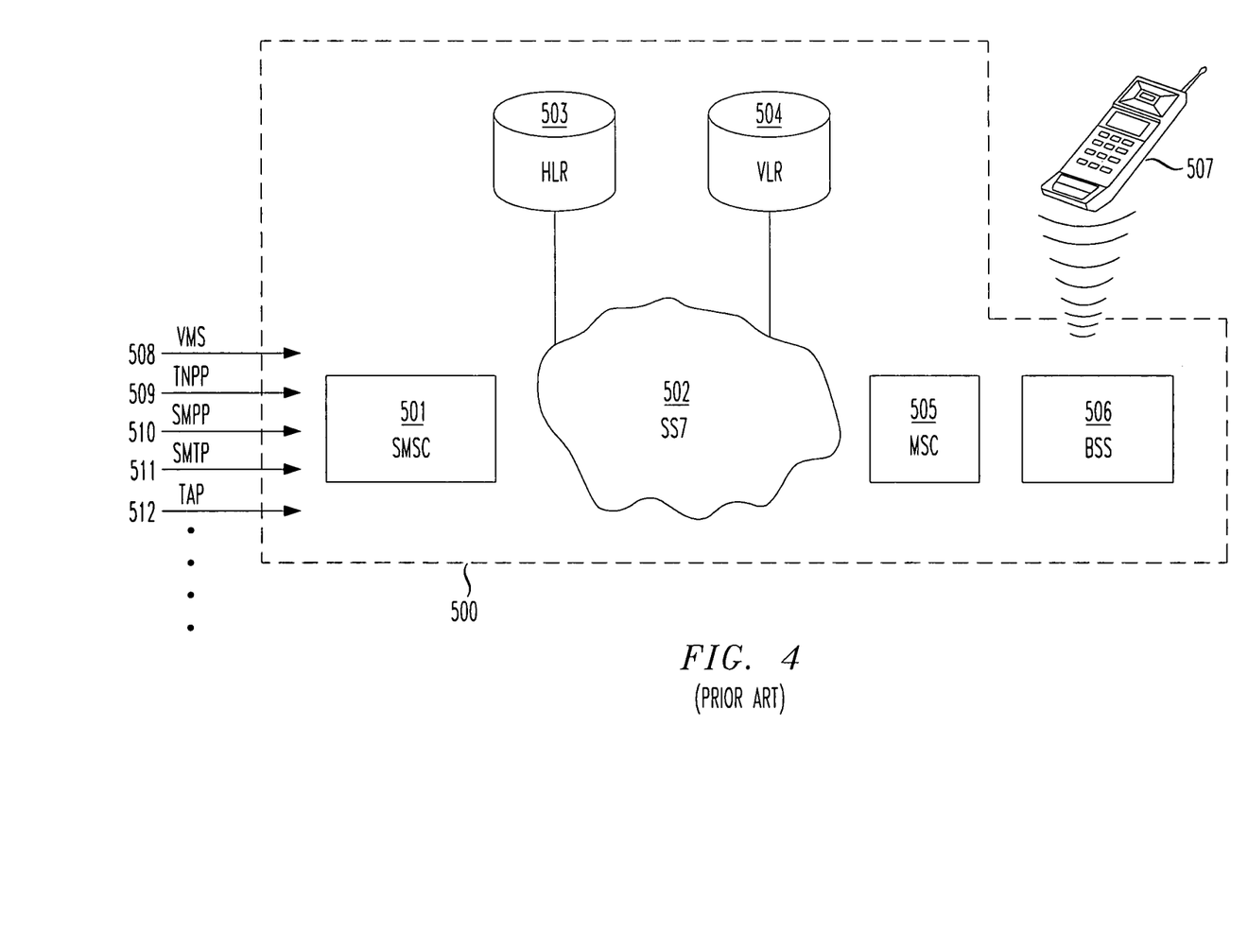
FIG. 4 shows relevant portions of a conventional short message service network.

FIG. 4 shows an exemplary structure of an SMS network 500. Although the following example is described using terms and protocols mainly as defined by the North American standard IS-41, it will be apparent to one skilled in the art that the example is applicable to any networks that offer store-and-forward type short message service.

A smaller SMS network 500 typically include one short message service center (SMSC) 501. The SMSC 501 typically includes a storage subsystem to store short messages that had failed to be delivered. The SMSC 501 typically further includes various interfaces (not shown) to receive short messages originating from various sources and protocols, such as a Voice Mail System (VMS) 508, paging networks using, e.g., Telocator Numeric Paging Protocol (TNPP) 509, devices using the Short Message Peer-to-Peer (SMPP) protocol 510 via TCP/IP, e-mail systems using the Simple Mail Transport Protocol (SMTP) 511, and/or devices using the Telocator Alphanumeric Protocol (TAP) 512. Some of the various sources of the short messages may be gateways to other networks.

The SMSC 501 may further include a gateway/interworking block (not shown) that enables the SMSC 501 to communicate with the rest of the SMS network 500, such as a Home Location Register (HLR) 503 or a Mobile Switching Center (MSC) 505, using the Signaling System No. 7 (SS7) 502.

The methods and mechanism of communication in the SMS network 500 are defined by the mobile application part (MAP) layer, which uses the services of the SS7 transaction capabilities application part (TCAP) as the signaling infrastructure of the SMS network 500. The protocol for the signaling is referred to as the IS-41 protocol under the American standard as published by the Telecommunication Industry Association (TIA) or as the GSM MAP under the European standard published by European Telecommunication Standards Institute (ETSI).

The Home Location Register (HLR) 503 includes a database that permanently stores and manages subscriptions and service profiles of users having a subscription to the SMS network 500. Although only one HLR 503 is shown, the SMS network 500 may include two or more HLRs. The SMS network 500 also typically includes several visitor location registers (VLR) 504. A VLR 504 is a database temporarily holding information about visiting subscribers who move into its service area. Thus, a VLR 504 contains information regarding routing information for all subscribers within its service area, and informs the relevant HLR 503 of the availability and routing information regarding its subscribers. The mobile switching center (MSC) 505 obtains subscriber information from the VLR 504 to service visiting subscribers.

The mobile switching center (MSC) 505 performs switching and call control functions, and receives short messages from the SMSC 501 for delivery to the appropriate mobile subscriber 507 (shown, e.g., as a cellular phone handset). It is to be understood that, although only one MSC 505 is shown, the wireless network 500 may include two or more MSCs.

The base station subsystem (BSS) 506 handles the wireless communications, e.g., RF transmission and reception of voice and data traffic, to and from the mobile subscriber 507. The BSS 506 is typically composed mainly of two parts: the base transceiver station (BTS, not shown) which houses the radio transceivers that define a cell and handles the radio-link protocols with the mobile subscriber 507, and the base station controller (BSC, also not shown) which manages the radio resources, and handles radio channel set up, frequency hopping, and handoffs (or handovers as is sometimes referred as). The BSC is the interface between the MSC 505 and the subscriber 507. The subscriber 507, also sometimes referred to as a mobile station (MS), typically consists of mobile equipment (e.g., a cellular phone handset) preferably uniquely identifiable by an identifying number, e.g., mobile identification number (MIN), International mobile subscriber identification (IMSI) and/or electronic serial number (ESN), for the subscriber 507. The mobile equipment may include a storage area, e.g., a flash memory, a ROM, a RAM or the like to hold the unique identifying number within the mobile equipment. In GSM networks, a smart card, typically referred to as a subscriber identity module (SIM) is utilized to store a unique identifying number.

Figure 5:
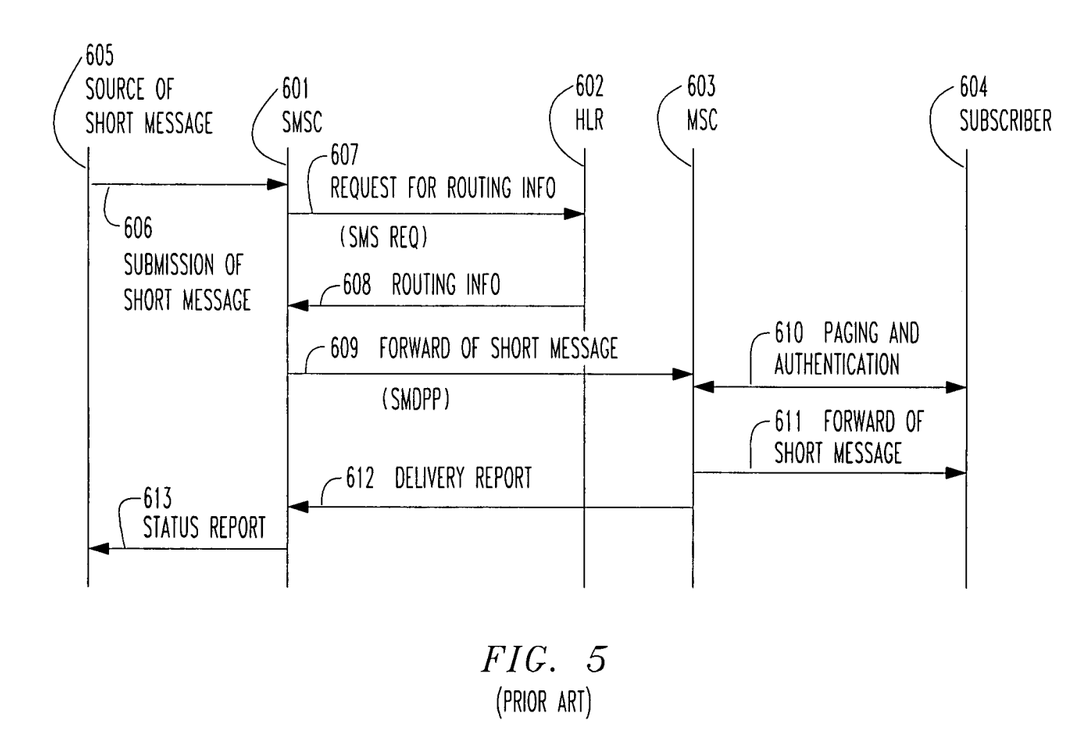
FIG. 5 shows a process of short message flow within a conventional short message service network.

FIG. 5 shows an exemplary flow of a short message through a conventional SMS network. Although FIG. 5 shows only an example of short message delivery to a mobile subscriber, it is to be understood that a mobile subscriber or any other sources may originate a short message. The flow of a mobile subscriber originated short message would involve similar processes as the following mobile subscriber terminated short message example, and would be apparent to one of ordinary skill in the art.

The SMSC 601 receives a short message intended for a subscriber 604 from a source of short message 605 which may be any one or more of the aforementioned sources of short messages, e.g., 508-512 of FIG. 4. Upon receiving a short message, the SMSC 601 sends a request for routing information, i.e., an SMS request (SMSREQ), to the HLR 602. The HLR 602 maintains information regarding the availability of the intended subscriber 604 and the appropriate MSC 603 that services the intended subscriber, and sends the information as routing information 608 back to the SMSC 601. The SMSC 601 forwards the short message to the appropriate MSC 603 using the routing information 608 received from the HLR 602, for example, in accordance with the short message delivery point-to-point (SMDPP) mechanism of IS-41 standard. The MSC 603 queries the VLR (not shown) for subscriber information. The VLR may perform a paging and authentication process, and sends the subscriber information to the MSC 603. The MSC 603, using the information received from the VLR, delivers the short message to the intended subscriber 604, and sends a delivery report 612 to the SMSC 601. The SMSC 601 may send the result of the delivery, i.e., the status report 613, to the source of the short message 605 if requested.

When the attempted delivery of the short message has failed because, for instance, the intended user was out of the service area, or had his or her communication device turned off, the MSC 603 informs the HLR 602 of the failure. The HLR 602 then turns on an SMS notification indicator flag for the subscriber, and the SMSC 601 retains the failed message for a later delivery attempt.

Figure 6:
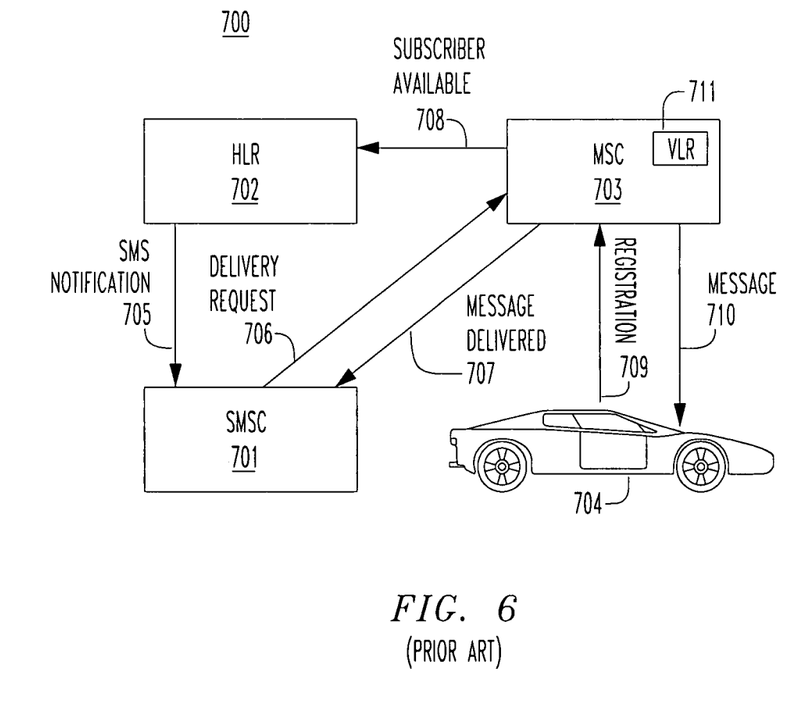
FIG. 6 shows a pending message delivery process in a conventional short message service network.

FIG. 6 shows a pending short message delivery process in a conventional short message service network after the mobile subscriber becomes available for delivery of the retained messages. In particular, in FIG. 6, when the subscriber 704 turns his or her handset on or comes within the service area, the subscriber's handset sends a registration signal 709 to the MSC 703. The registration signal 709 may or may not include authentication process.

Upon receiving the registration signal 709, the MSC 703 informs the HLR 702 (or the VLR 711) of the availability of the subscriber 704 by sending a subscriber available signal 708. Because the SMS notification flag for the subscriber is on, the HLR 702 or the VLR 703 sends an SMS notification (SMSNOT) message 705 in case of networks implementing IS-41 standard, or an equivalent notification alerting the fact that the subscriber has become available in networks implemented in accordance with other standards, to the SMSC 701 assigned to service that particular intended subscriber 704.

The SMSC 701 then sends a delivery request 706 to the MSC 703 via, for example, the SMDPP protocol in the IS-41 standard. The MSC 703 finally delivers the short message 710 to the subscriber 704, and sends a message delivered message 707 back to the SMSC 701 to confirm and finalize the delivery of the short message. The SMSC 701 may further send a delivery report to the source of the short message if it was requested.

The Wireless Application Protocol (WAP) attempts to standardize a mechanism for two-way communications. However, WAP requires that a special browser be loaded on the handset, and requires the user to enter into a dedicated 'browser mode' in order to interact with 2-way services.

Put simply, not all wireless devices, particularly older devices, are WAP-capable. Accordingly, these non-capable and/or older wireless devices can't run advanced applications, e.g., those requiring location updates from the wireless device. From the perspective of the wireless carrier, the more wireless devices than can make use of advanced applications, the more income they make by charging on a per subscriber basis.

Thus, there is a need for a method and system to allow legacy wireless devices to be part of the larger community of wireless devices that support, e.g., LBS applications. In this way, a wireless carrier can maximize their average revenue per user (ARPU) by accelerating adoption of newer applications, e.g., location based services (LBS) applications.

SUMMARY OF THE INVENTION

In accordance with the principles of the present invention, a method and apparatus for allowing location based services communication using SMS proxy messaging comprises receiving a location based services (LBS) query encapsulated within an SMS proxy message. The LBS query is extracted from the SMS proxy message, and transmitted using an Internet Protocol (IP).

A method and apparatus for initiating a location based service using SMS messaging in accordance with another aspect of the invention comprises encapsulating a location based services (LBS) query within an SMS proxy message, and transmitting the SMS proxy message including the LBS query from a wireless device to an operator's network using SMS protocols.

DETAILED DESCRIPTION OF ILLUSTRATIVE EMBODIMENTS

Short messaging system (SMS) functionality is implemented as a least-common-denominator means enabling standardized communication between a wireless device and a location based application for older or otherwise non-capable wireless devices. Wireless devices use SMS messaging as a proxy communications means to communicate with a proxy server (e.g., a wireless messaging gateway) to generate subscriber initiated requests. The subscriber initiated requests are packaged within SMS messages, allowing wireless devices a simple mechanism for participating in, e.g., location based services (LBS) communities, and for generally extending LBS presence type information to non-programmable handset devices.

Current location based services (LBS) applications typically are implemented using downloadable programs (applications) to a wireless device. Existing methods for LBS applications are based on downloadable applications written in Binary Runtime Environment for Wireless (BREW) and Java 2 Platform Micro Edition (J2ME), both relatively new and advanced capabilities for higher-end wireless devices.

To download and run such LBS applications, existing techniques require that the wireless device be enabled to support downloadable applications. Moreover, many current business plans require a subscriber to pay a monthly subscription fee to enable support of such downloadable applications.

While most new wireless devices support some form of downloadable application environment, the number of legacy handsets currently in the market far exceeds the penetration of newer handset technologies already capable of downloading a location based services (LBS) application.

The present invention provides an architecture and method to allow older, non-compatible, or perhaps just less expensive or less capable wireless devices to participate in advanced applications by using short message system (SMS) communications between wireless devices and application servers on the Internet. In this way, specialized browsers are not required. In disclosed embodiments, this SMS proxy communication makes use of existing communication standards utilized by standard short message services centers (SMSCs), e.g., Short Message Peer-to-Peer (SMPP) protocol.

The present invention enables wireless devices a basic means of communicating (SMS messaging) with a proxy server (e.g., a wireless messaging gateway) to generate network initiated requests. In this way, the wireless device which might not otherwise be able to, can now participate in advanced applications such as location based services (LBS) communities, thus extending LBS presence type information to non-programmable wireless devices.

In particular, a wireless device is enabled to leverage LBS applications by providing a proxy server for the LBS application interaction that uses SMS (as the least common denominator) to communicate with the handset device. The system also enables more advanced messaging capabilities for the device such as multimedia messaging system (MMS) if the device is so enabled.

Figure 1:
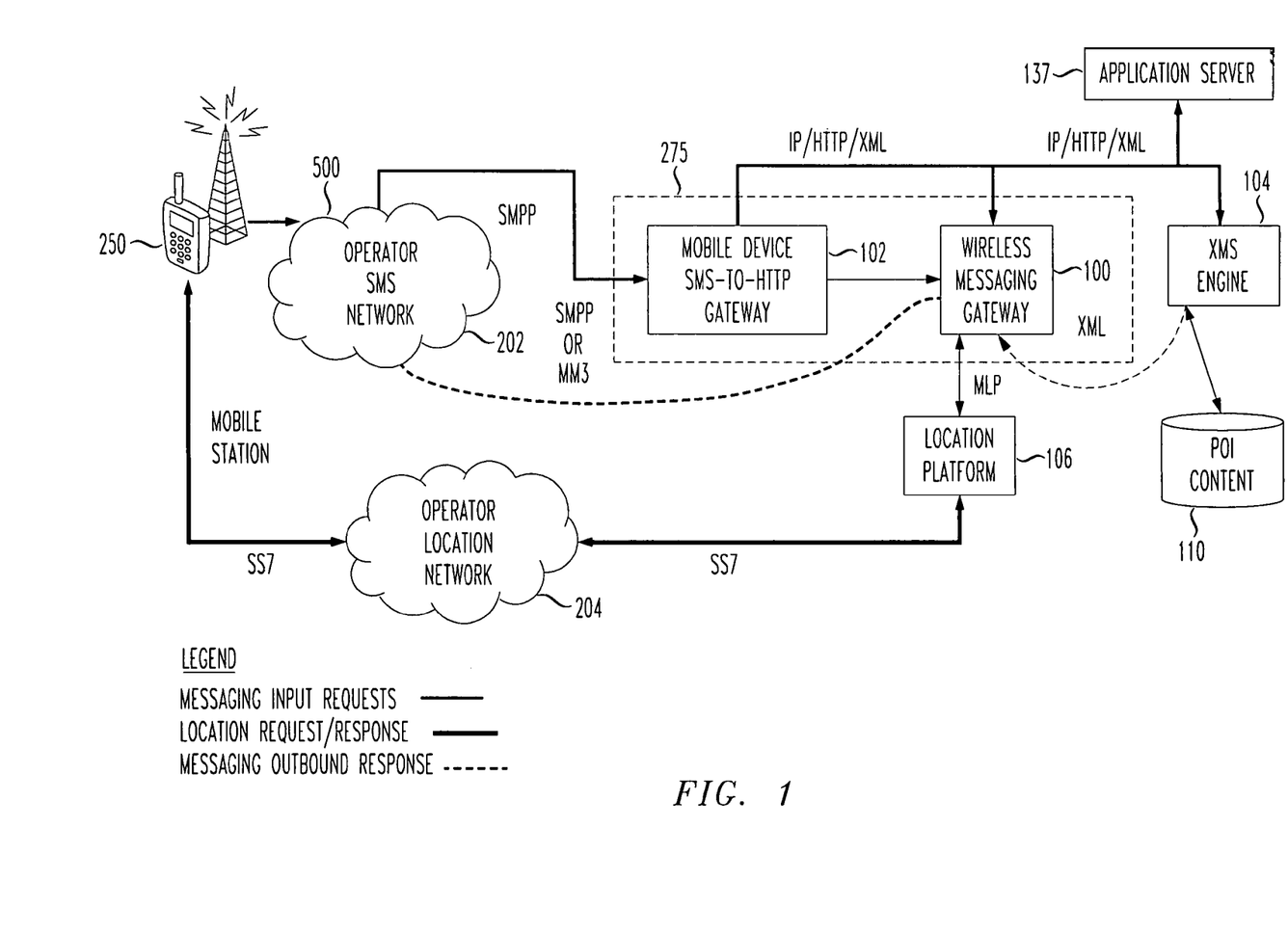
FIG. 1 shows exemplary system architecture allowing SMS proxy communications between a wireless device and a location based application, in accordance with the principles of the present invention.

FIG. 1 shows exemplary system architecture allowing SMS proxy communications between a wireless device and a location based application, in accordance with the principles of the present invention.

In particular, as shown in FIG. 1, a mobile device 250 utilizes SMS messaging through their operator's SMS network 500 to communicate with a location platform 106 such as a mobile positioning center (MPC) (or in a GSM network a Gateway Mobile Location Center (GMLC)) via an SMS proxy server 275.

The SMS proxy server 275 includes a mobile device SMS-to-IP gateway module 102, and a wireless messaging gateway module 100. The SMS proxy server 275 communicates with the operator's SMS network 500 via SMPP protocols (or MM3 protocols), and with application programs (represented in FIG. 1 by the extended mapping server (XMS) engine 104 and proof of identity (POI) content database 110) over the Internet. The mobile device SMS-to-IP gateway 102 may be such as that shown and described in co-owned U.S. Pat. No. 6,891,811 (and pending continuation U.S. application Ser. No. 11/113,033), the entirety of which is expressly incorporated herein by reference. The mobile device SMS-to-IP gateway 102 enables a mobile subscriber to obtain an HTTP proxy access to wireless data services via an Internet transport.

The location platform 106 (e.g., a XYPoint™ location platform) communicates with the operator's location network 204 using signaling system No. 7 (SS7) protocols, and communicates with the SMS proxy server 275 using mobile location protocol (MLP) protocols. The operator's location network 204 communicates with the wireless device 250 using SS7 protocols or direct IP protocols as well.

Importantly, the SMS proxy server 275 does not require a specialized client on the device (though one could be present but not used). Rather, in accordance with the principles of the present invention, the client is "simulated" using SMS messaging to deliver a menu of options, responses, status updates, etc. This SMS interface offers subscribers an alternative method of communicating with advanced applications, e.g., triggering SMS location based services. In one embodiment of the invention, "coverage".

FIG. 1 also shows a network initiated application running on a suitable application server 137, that integrates with a handset via SMS. The application may be, for example, a friend finder application where devices leverage the application server 137 to track members of a pre-defined group. In such application, SMS messaging is used to request status of members and/or their proximity to a given user.

The present invention discloses a method of network initiated LBS applications consisting of a "proxy" server for receiving these requests from either a remote device or application, processing these requests (based on subscriber/application provisioning data), submission of these requests to a location server over a standard interface (e.g., location interoperability forum (LIF) mobile location protocol (MLP)), the location server submission of these requests to a location determining entity that resolves the location request based on the network technology implemented (assisted global positioning system (AGPS), cell site & sector, uplink time difference of arrival (UTDOA), timing advance, etc.), the response of the location determining entity (XY) that includes quality of service indicating accuracy, the processing of the XY response by the location server according to the parameters of the request from the application, the delivery of the response to the network initiated "proxy" server, the formulation and delivery of an application/device appropriate response by the "proxy" server whether SMS, MMS, or some other formatted data including binary files.

Figure 2:
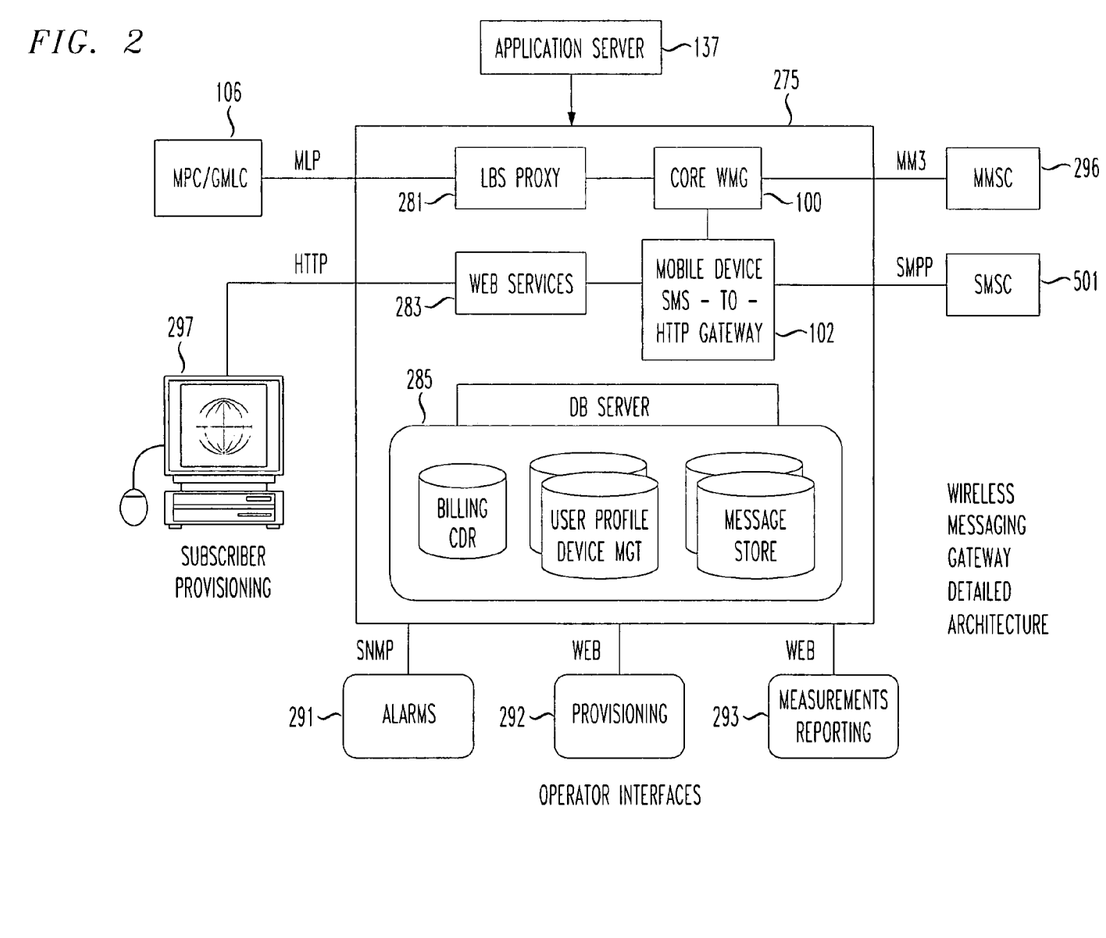
FIG. 2 shows exemplary architecture of an SMS proxy server shown in FIG. 1.

FIG. 2 shows exemplary architecture of an SMS proxy server shown in FIG. 1.

In particular, as shown in FIG. 2, the disclosed SMS proxy server 275 includes the mobile device SMS-to-IP gateway 102 and core wireless messaging gateway 100 as shown and described with respect to FIG. 1. In addition, the SMS proxy server 275 may include a location based services (LBS) proxy module 281, and a web services module 283.

A database server 285 includes relevant data, such as billing customer data records (CDR), user profile device management, and/or SMS message storage.

The SMS proxy server 275 may communicate with relevant operator interfaces such as alarms 291 using SNMP protocols, provisioning 292 via the web (TCP/IP), measurements reporting 293 via the web, etc. Subscriber provisioning may be accomplished by the wireless operator via web communications to the SMS proxy server 275. The SMS proxy server 275 communicates with the operator's short messaging services center (SMSC) 501 via SMPP protocols, and with a multimedia messaging service center (MMSC) 296 via MM3 protocols. A mobile positioning center (MPC) 106 communicates with the LBS proxy module 281 via mobile location protocol (MLP) protocols.

FIG. 2 also depicts linkage between the SMS proxy server 275 and an application server 137, e.g., a third party application server.

Figure 3:
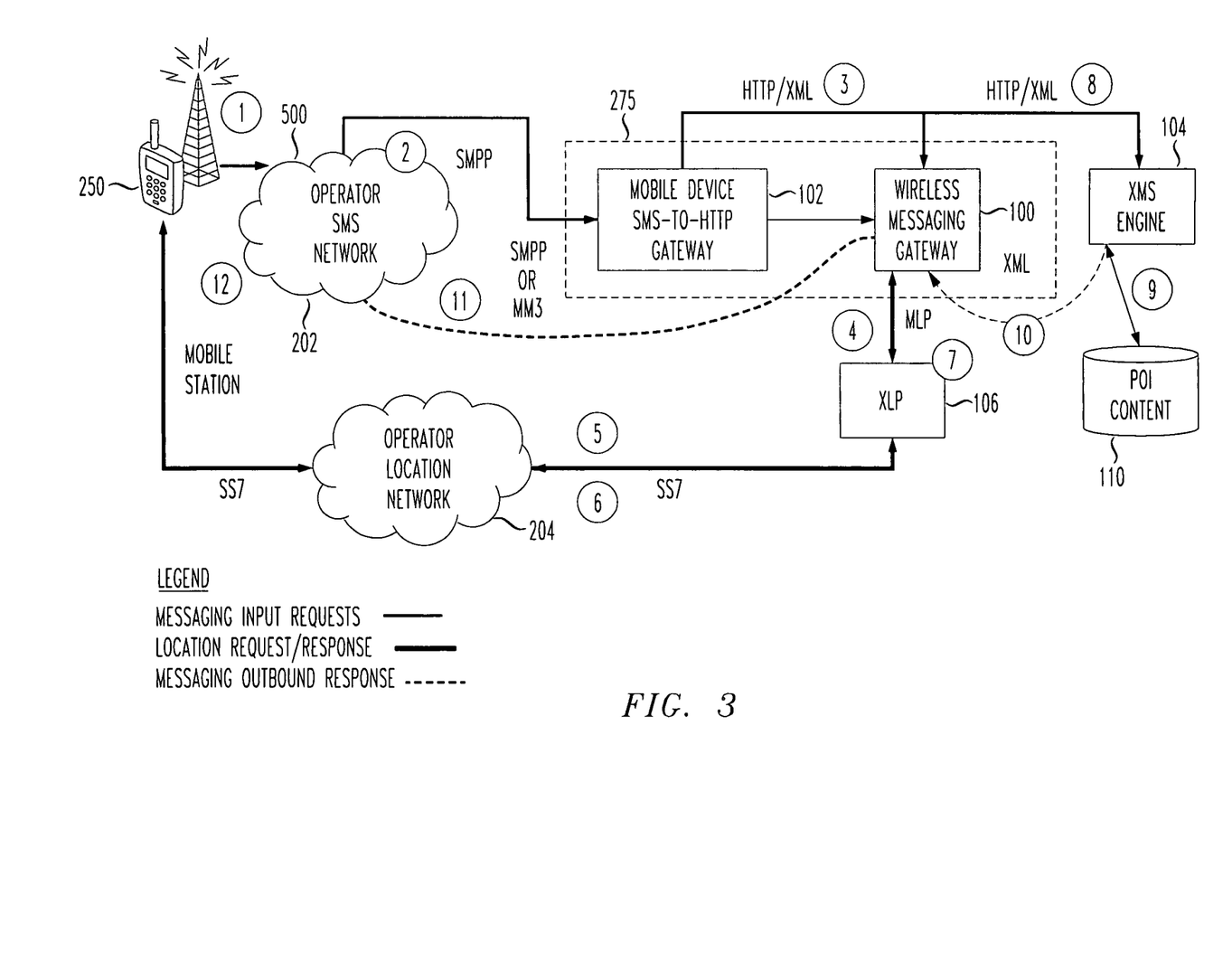
FIG. 3 shows an exemplary service flow description for the system architecture shown in FIGS. 1-3.

FIG. 3 shows an exemplary service flow description for the system architecture shown in FIGS. 1-3.

In particular, the exemplary service flow description shown in FIG. 3 describes the service flow and sequence of events for implementation of an SMS network initiated location request based on a mobile originated (MO)-to-HTTP model.

In step 1 of FIG. 3, the mobile subscriber user 250 composes an SMS text message and sends to a fixed address represented by a unique digit string typically referred to as a short code. The user 250 may enter a specific key word in the body of the SMS text message representing the desired service query (e.g., Point of Interest Finder, Friend or Family Finder, etc.)

For example, the user 250 may compose an SMS text message containing the text string "ATM", representing a query to obtain the address of the closest automatic teller machine (ATM).

In step 2, the SMS text message is routed by the mobile operator network 500 to the serving Short Message Service Center (SMSC) 501. The SMSC 501 then routes the SMS text message to an IP address and port number associated with the short code designated by the user 250.

This message is conventionally encapsulated within the industry standard SMPP protocol that is carrier over an IP transport to a pre-processor or wireless messaging gateway. In the disclosed embodiment, the mobile device SMS-to-IP gateway 102 forms a preprocessor for the inbound message.

In step 3, the mobile device SMS-to-IP gateway module 102 parses the SMPP message into informational parameters that define the mobile subscriber originating address (i.e., Mobile Directory Number), and the key word query (e.g., ATM). Additional information contained in the SMPP message is preferably stored as necessary in compliance with any relevant protocol specification.

The relevant service parameters are then passed to the wireless messaging gateway (WMG) 100 on behalf of the mobile subscriber 250.

In step 4, the WMG 100 receives the service parameters and establishes a proxy connection via HTTP to the location based services server 106. In the disclosed embodiments the location based services MPC 106 is one commercially available from TeleCommunication Systems, Inc. of Annapolis, Md. called XYpoint™ Location Platform (XLP). At this point the WMG 100 has essentially established a proxy connection to location based services MPC 106 on behalf of the mobile device user 250.

The WMG 100 requests location services preferably using the industry standard mobile location protocol (MLP) stack. In this scenario, the WMG 100 composes a message that the location server 106 uses to obtain the exact position of the user 250 that initiated the SMS message. Thus, the application server 137 processes a number and ATM to formulate a point of interest (POI) query.

In step 5, using industry standard location based protocols; the location platform (MPC 106) sends a message to the mobile operator network 500 requesting the current location of the mobile user 250 pending appropriate user authentication, authorization and service access provisioning. Should authentication fail, the location service preferably provides exception handling informing the wireless user 250 with appropriate user feedback e.g., service not authorized, error messages, etc.

In step 6, assuming successful authentication, authorization and access, the mobile location platform (MLP) of the operator's network 500 returns position information, e.g., X, Y coordinate expressed in longitude and latitude decimal degrees. Note that the X,Y coordinate may be of precise resolution or coarse resolution.

In step 7, the location platform (MPC 106) receives the user coordinate information and returns this information to the WMG 100, e.g., based on the MLP protocol specification.

In step 8, the WMG 100 then uses the subscriber position, and in conjunction with the key word service query (e.g., ATM), launches a point of interest geographic query to a database server, e.g., a XYpoint Mapping Server (XMS) commercially available from TeleCommunication Systems, Inc. of Annapolis, Md.

In steps 7 and 8 the wireless messaging gateway (WMG) 100 is acting as both proxy and application server. However, it could be two different boxes in accordance with the principles of the present invention.

As in step 4, the user 250 thus obtains proxy to access to database records 110 relating to spatial points of interest, e.g., existing on a relevant server. This interface may be accomplished, e.g., via a suitable applications programming interface (API) implemented via an HTTP/XML data stream interface.

In step 9, the application (e.g., XMS engine 104) queries the points of interest (POI) database 110 to determine a list satisfying the query for the desired points of interest, e.g., ATM machines within a specified radius. The specified radius may be delivered with the original message or a service configurable by the operator with a default value, e.g., within a default distance of 5 miles.

In step 10, the location-based application (e.g., XMS engine 104) returns the requested information to the WMG 100 via HTTP transport using the XML API described in step 8.

In step 11, the WMG 100 has received the requested point(s) of interest information in HTTP/XML format, and then prepares the data for delivery to the mobile user 250 in a relevant format. Exemplary formats are either plain text format using SMPP protocol or multimedia format (e.g., a points of interest annotated map display image) using, e.g., the industry standard MM3 specification for delivery of multimedia messages (MMS) to mobile devices, or a digital stream of video and/or audio.

The WMG 100 preferably contains a user profile record depicting unique subscriber information. The unique subscriber information may also include the type of mobile device.

Preferably the default behavior is to send the information as a plain text SMS message, though other transmission formats are within the scope of the present invention. Once the message has been composed, the WMG 100 sends the SMS message to the originating operator SMS or MMS network domain.

In step 12, once the corresponding mobile operator network element has received the SMS message, it is then stored and forwarded for delivery per standard operation of that network element.

Upon delivery, the mobile user 250 receives the requested information on their mobile device.

The present invention relates not just to wireless handsets or other mobile devices, but in general to the formation of an SMS message proxy allowing network initiated location based services for other devices or applications. In conjunction with the present invention, premium billing options and/or detailed reporting options may be implemented.

The invention has applicability to location based services (LBS) applications making use of location queries via SMS messaging. It also has applicability to wireless service providers and application developers, particularly with respect to developers of BREW and J2ME downloadable applications.

While the invention has been described with reference to the exemplary embodiments thereof, those skilled in the art will be able to make various modifications to the described embodiments of the invention without departing from the true spirit and scope of the invention.

What is claimed is:

1. A method of allowing location based services using short messaging services (SMS) messaging, comprising:
   receiving from a physical wireless device, at an intermediary SMS proxy server, a short messaging services (SMS) message including a location based services (LBS) query comprising a user entered key word text string;
   transmitting, from said intermediary SMS proxy server, said LBS query to a physical location services platform;
   receiving, at said intermediary SMS proxy server, point-of-interest data associated with said user entered key word text string and based on a location of said physical wireless device; and
   sending from said intermediary SMS proxy server said point-of-interest data to said physical wireless device;
   wherein said physical location services platform comprises one of a physical mobile positioning center (MPC) and a physical gateway mobile location centre (GMLC).

2. The method of allowing location based services using SMS messaging according to claim 1, wherein:
   said LBS query is initiated by said physical wireless device and said point-of-interest is communicated to said physical wireless device using SMS messaging.

3. The method of allowing location based services using SMS messaging according to claim 1, wherein:
   said physical wireless device is a fixed device, and
   said LBS query is initiated by said fixed device.

4. The method of allowing location based services using SMS messaging according to claim 2, wherein:
   said physical wireless device is a mobile phone, and
   said LBS query is initiable by said mobile phone.

5. The method of allowing location based services using SMS messaging according to claim 1, wherein:
   said physical wireless device is a pager.

6. The method of allowing location based services using SMS messaging according to claim 1, wherein:
   said SMS message is an SMS text message.

7. The method of allowing location based services using SMS messaging according to claim 1, wherein:
   said SMS message is an SMS multimedia message.

8. The method of allowing location based services using SMS messaging according to claim 1, wherein:
   said SMS message is an SMS enhanced messaging service (EMS) message.

9. The method of allowing location based services using SMS messaging according to claim 1, wherein:
   said SMS message is an SMS multimedia message service (MMS) message.

10. The method of allowing location based services using SMS messaging according to claim 1, wherein:
    said LBS query is a text string.

11. Apparatus for allowing location based services using short messaging services (SMS) messaging, comprising:
    means for receiving from a physical wireless device, at an intermediary SMS proxy server, a short messaging services (SMS) message including a location based services (LBS) query comprising a user entered key word text string;
    means for transmitting, from said intermediary SMS proxy server, said LBS query to a physical location services platform;
    means for receiving, at said intermediary SMS proxy server, point-of-interest data associated with said user entered key word text string and based on a location of said physical wireless device;
    means for sending from said intermediary SMS proxy server said point-of-interest data to said physical wireless device; and
    means for processing said LBS query comprising one of a physical mobile positioning center (MPC) and a physical gateway mobile location centre (GMLC).

12. The apparatus for allowing location based services using SMS messaging according to claim 11, wherein:
    said LBS query is initiable by said physical wireless device.

13. The apparatus for allowing location based services using SMS messaging according to claim 11, wherein:
    said LBS query is initiable by a fixed device.

14. The apparatus for allowing location based services using SMS messaging according to claim 12, wherein:
    said physical wireless device is a mobile phone.

15. The apparatus for allowing location based services using SMS messaging according to claim 12, wherein:
    said physical wireless device is a personal digital assistant (PDA).

16. The apparatus for allowing location based services using SMS messaging according to claim 11, wherein:
    said SMS message is an SMS text message.

17. The apparatus for allowing location based services using SMS messaging according to claim 11, wherein:
    said SMS message is an SMS multimedia message.

18. The apparatus for allowing location based services using SMS messaging according to claim 11, wherein:
    said LBS query is a text string.

19. The apparatus for allowing location based services using SMS messaging according to claim 11, wherein:
    said LBS query is initiable by a physical wireless tag.

* * * * *